United States Patent
Odenmarck et al.

(10) Patent No.: US 11,085,369 B2
(45) Date of Patent: Aug. 10, 2021

(54) CRANKSHAFT AND CONROD ASSEMBLY

(71) Applicant: Volvo Car Corporation, Gothenburg (SE)

(72) Inventors: Christer Odenmarck, Torslanda (SE); Peter Petrov, Angered (SE); Fredrik Strömstedt, Hagalund (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/611,895

(22) PCT Filed: May 8, 2018

(86) PCT No.: PCT/EP2018/061896
§ 371 (c)(1),
(2) Date: Nov. 8, 2019

(87) PCT Pub. No.: WO2018/206589
PCT Pub. Date: Nov. 15, 2018

(65) Prior Publication Data
US 2021/0079839 A1 Mar. 18, 2021

(30) Foreign Application Priority Data
May 9, 2017 (EP) ..................................... 17170209

(51) Int. Cl.
*F02B 75/04* (2006.01)
*F02D 15/04* (2006.01)
(Continued)

(52) U.S. Cl.
CPC ............ *F02B 75/045* (2013.01); *F02D 15/04* (2013.01); *F16C 7/06* (2013.01); *F01M 1/06* (2013.01);
(Continued)

(58) Field of Classification Search
CPC .......... F02B 75/045; F02D 15/04; F16C 7/06; F16C 3/14; F16C 9/04; F16C 2360/22;
(Continued)

(56) References Cited

U.S. PATENT DOCUMENTS 2,444,108 A    6/1948   Norton
4,201,176 A * 5/1980   Lustgarten ................ F16C 9/04
                                                                                  123/196 M
(Continued)

FOREIGN PATENT DOCUMENTS

GB                950215 A    2/1964

OTHER PUBLICATIONS

Nov. 6, 2018 International Search Report issued on International Application No. EP18061896.

*Primary Examiner* — Jacob M Amick
(74) *Attorney, Agent, or Firm* — Clements Bernard Walker; Christopher L. Bernard

(57) ABSTRACT

A crankshaft and conrod assembly (100) comprising a crankshaft (110) and a conrod (150), wherein the crankshaft (110) comprises at least one main journal (111) and one crankpin journal (112), where the crankshaft (110) is provided with an oil supply structure for supplying the crankpin journal (112) with lubrication oil and the conrod (150) with an oil pressure, wherein the oil supply structure comprises: an oil supply conduit (113) provided between the main journal and the crankpin journal (112), at least a first and a second oil supply opening (114, 115) provided at the crankpin journal (112), and a connection point (116) where the oil supply conduit (113) connects to the first and second oil supply opening (114, 115).

20 Claims, 7 Drawing Sheets

(51) Int. Cl.
  *F16C 7/06* (2006.01)
  *F16C 9/04* (2006.01)
  *F01M 1/06* (2006.01)
  F01M 11/02 (2006.01)
  F16C 3/14 (2006.01)

(52) U.S. Cl.
  CPC . *F01M 2001/062* (2013.01); *F01M 2011/026* (2013.01); *F01M 2011/027* (2013.01); *F16C 3/14* (2013.01); *F16C 9/04* (2013.01); *F16C 2360/22* (2013.01)

(58) Field of Classification Search
  CPC .............. F01M 1/06; F01M 2011/026; F01M 2001/062; F01M 2001/066; F01M 2011/027
  See application file for complete search history.

(56) References Cited

U.S. PATENT DOCUMENTS

| | | | |
|---|---|---|---|
| 4,370,901 A | | 2/1983 | Bolen |
| 5,152,373 A | * | 10/1992 | Callies ................... F01M 1/06 123/196 R |
| 2015/0075497 A1 | | 3/2015 | Hutzelmann et al. |

\* cited by examiner

CRANKSHAFT AND CONROD ASSEMBLY

CROSS-REFERENCE TO RELATED APPLICATION

The present disclosure claims the benefit of priority of co-pending PCT/EP2018/061896, the contents of which are incorporated in full by reference herein for all purposes.

TECHNICAL FIELD

The disclosure concerns a crankshaft and conrod assembly, a combustion engine with a variable compression ratio as well as a vehicle provided with a combustion engine with a variable compression ratio.

BACKGROUND

A connection rod or a conrod for a variable compression ratio engine is for example known from US 2015/075497. In which it can be seen that in order to achieve a variable length on the conrod, the conrod is provided with a cylinder mechanism adjusting the conrod length, whereby the cylinder mechanism is controlled with oil pressure. The oil pressure is provided from a crank pin bearing. The present disclosure concerns vehicle with a combustion engine with variable compression ratio and especially a crankshaft and conrod assembly enabling to transferring an oil pressure in to the conrod.

SUMMARY

The subject of the disclosure is to present a crankshaft and conrod assembly enabling a continuous feed of oil pressure to the conrod for controlling the length of the conrod. Another aspect of the disclosure is to present a variable compression ratio combustion engine provided with a crankshaft and conrod assembly and yet another aspect of the disclosure is to present a vehicle provided with the mentioned combustion engine.

Oil pressure is fed to the conrod through an oil supply opening in the crankpin journal, which opening feeds to an oil groove in a bearing sleeve. Having one oil groove extending about the whole circumference of the crankpin bearing allow just one oil supply opening in order to continuously provide the conrod with oil pressure independent of angular position of the conrod upon the crankpin journal. However, one oil groove extending about the whole circumference would also collapse the oil film and drive the need for a wider bearing, which is in most cases undesired.

The crankshaft and conrod assembly comprising a crankshaft and a conrod, alternative and equivalent wording for a conrod is a connection rod.

The crankshaft comprises a rotational axis and one crankpin journal arranged offset to the rotational axis of the crankshaft. In the crankshaft conrod assembly at least one conrod is provided upon the crankpin journal.

The crankshaft is provided with an oil supply structure for supplying the crankpin journal with lubrication oil and the conrod with an oil pressure. This allows a continuous lubrication of the crankpin journal. Additionally the oil supply structure transfers a continuous pressurized oil in to an oil channel structure in the conrod. The oil supply structure comprises an oil supply conduit provided between a main journal, which is coaxial with the rotational axis of the crankshaft and the crankpin journal first and a second oil supply opening at the crankpin journal, and a connection point where the oil supply conduit connects to the first and second oil supply opening. The oil supply openings are provided as conduits extending between the surface of the crankpin journal and the oil supply conduit.

In all the exemplary embodiments, the oil supply openings can for example be provided as drill holes or be pre-formed in the goods during casting of the crankshaft.

With a conduit is meant any kind of passage, channel or path that fulfils the purpose of transfer an oil pressure between for example the two ends of the conduit or an oil supply opening and a connection point. A crankpin bearing comprises of a crankpin journal and a conrod bearing sleeve, when the bearing sleeve is mounted upon the crankpin journal.

The conrod is arranged upon the crank pin journal through its bearing sleeve, at which at least a first and a second oil groove are provided in a circumferential direction at an inner surface of the bearing sleeve.

The first oil supply opening is provided at a first radial distance from a rotational axis of the crankshaft. The second oil supply opening is provided at a second radial distance from the rotational axis of the crankshaft. The connection point is provided at a third radial distance from the rotational axis of the crankshaft. Both the first and second radial distances are larger or equal to the third radial distance. An exemplary effect of the arrangement of the oil supply openings according to this is that all oil supply openings are provided at, a minimum, the same distance from the rotational axis of the crankshaft whereby a centrifugal force never will have a negative effect on the oil pressure in between the connection point and the oil supply openings. In all positions where the oil supply openings are provided at a distance larger than the distance between the connection point and the rotational axis of the crankshaft, the centrifugal force will even increase the oil pressure in the position between the connection point and the oil supply openings.

Additional oil supply openings could be provided in between the first and second oil supply openings. All additional oil supply openings beyond the first and second oil supply openings may be provided in between the first and second oil supply opening such that the additional oil supply openings are provided at distance from the rotational axis of the crankshaft larger than the distance between the connection point and the rotational axis of the crankshaft.

In one exemplary embodiment of the crankshaft and conrod assembly an opening angle (A) between the first and the second oil supply opening is larger or equal to the angles (B1, B2) between the opposing end portions of the two oil grooves and the angular length (C1, C2) of the respective oil groove is larger or equal to the angels (B1, B2) between the opposing end portions of the two oil grooves. I.e.: the following must be fulfilled:

$A \geq (B1 \text{ and } B2);$ $A \leq (C1 \text{ and } C2);$ $(C1 \text{ and } C2) \geq (B1 \text{ and } B2).$ An exemplary effects, of the relation between the opening angle between the first and second oil supply opening, the angle between the opposing end portions of the oil grooves and the angular length of the oil grooves, is that at least one oil groove will always be in fluid contact with one oil supply opening, whereby oil pressure always will be provided to the conrod, independent of angular position upon the crankpin journal and at the same time enabling that the oil grooves can be held as short as possible and thereby maximising the bearing surface and minimising the needed width of the bearing.

The oil grooves must not be, but could be arranged such that the angles between the opposing end portions of the two oil grooves are essentially equal, i.e. B1=B2. The angular length of the first oil groove, must not be but can be, essentially equal to the angular length of the second oil groove, i.e. C1=C2.

An another exemplary embodiment of the crankshaft and conrod assembly the angle (A) between the first and the second oil supply opening is larger than an angle (B1, B2) between opposing end portions of the two oil grooves and the angle (A) between the first and the second oil supply opening is larger than the angular distance (C1, C2) of at least one of the oil grooves and at least a third oil supply opening is provided in between the first and the second oil supply opening.

An exemplary effect of the above exemplary embodiment is that the oil grooves in the bearing sleeve can be made shorter and thereby the load bearing surface in the bearing larger, whereby the third oil supply opening still ensures that at least one oil groove is in fluid contact with one oil supply opening, whereby oil pressure always will be provided to the conrod independent of angular position upon the crankpin journal. This maximises the bearing surface and minimising the needed width of the bearing for take up the loads the bearing is subjected to.

The first and second oil supply opening can be connected with a channel extending as a chord between the first and second oil supply opening. The connection point is thereby preferably provided at the proximity of the one of the first and second oil supply openings that is arranged the shortest distance from the rotational axis of the crankshaft, but the connection point may also be provided at another position of the chord. However, it is advantageous to arrange the connection point as close to the rotational axis of the crankshaft as possible.

Additional oil supply openings arranged in-between the first and second oil supply opening can connect directly to the chord.

The distance between the connection point and the rotational axis of the crankshaft is preferably minimized. The pressure in the oil feed to the conrod, i.e. the pressure in the oil supply openings is dependent on the rotational speed of the crankshaft. By minimizing the distance between the connection point and the rotational axis of the crankshaft, the rotational speed dependency of the pressure in the oil feed system can be minimized. However, geometric properties of the crankshaft limits the possible positions of the oil supply conduit drilled in the crankshaft and thus the possible position of the connection point. This will in turn limit the possible position of the first oil supply opening which will be arranged close to the connection point.

An exemplary effect of a chord connection is that a minimal of post machining is needed in order to create the oil supply openings. I.e. two oil supply openings can be achieved with just one drill hole.

In an exemplary embodiment with a chord connection between the first and second oil supply opening, an oil supply channel to the connection point is provided close to the one of the first and second oil supply opening that is at the shortest radial distance from the rotational axis of the crankshaft. Other positions of the connection point with regards to the first and second oil supply opening are also possible, but are less favourable. In one exemplary embodiment, the oil supply openings are also located such that all positions along the chord are at a larger radial distance from the rotational axis of the crankshaft than the oil supply opening closest to the rotational axis of the crankshaft, i.e. the first oil supply opening. Exemplary effects thereof is that an easy manufacturing of the oil supply channel will be possible through drilling and that the centrifugal force will not have any negative effect on the oil pressure between the connection point and the two oil supply openings.

In another exemplary embodiment with a chord connection between the first and second oil supply opening, a third oil supply opening is provided in-between the first and second oil supply opening. The third oil supply opening connects directly to the chord through e.g. a drill hole. By connecting the third oil supply opening to the chord at the position along the chord having the shortest radial distance to the rotational axis of the crankshaft, the connection can be extended to realise the connection point to the oil supply conduit, without the need for placing the connection point next to one of the first and second oil supply openings. At the same time the exemplary effects of an easy manufacturing of the oil supply channel will be possible through drilling and the centrifugal force will not have any negative effect on the oil pressure between the connection point and the two oil supply openings.

The connection point can be provided at a centre axis of the crankpin journal, whereby the oil channels to the oil supply openings extends essentially perpendicular from an outer surface of the crankpin journal to the connection point. The oil supply may constitute of drill holes, but may also be pre-formed in the material or manufactured in any other suitable manner.

Exemplary opening angles between the first and the second oil supply opening is between 85 and 180 degrees. When having just two oil supply openings, the opening angle between the first and the second oil supply opening is e.g. in-between 85 and 95 degrees.

The first and the second oil groove can exemplary be provided with at least one feeding hole respectively, through which the conrod is fed with oil pressure. The feeding holes typically extend through the bearing sleeve, enabling the oil pressure to reach the oil pressure conduits of the conrod.

A crankshaft can be provided with a plurality of crankpin journals, where, for the application, a suitable number of crankpin journals are provided with a conrod. This could be anything from all to one of the crankpin journals that is provided with a conrod.

In an exemplary embodiment, a variable compression ratio combustion engine is provided with a crankshaft and conrod assembly. The combustion engine can have any odd or even number of cylinders.

In another exemplary embodiment, the crankshaft and conrod assembly is arranged in the combustion engine such that when the combustion in the cylinder of the combustion engine exercises its highest force upon the conrod, the bearing sleeve and the oil supply openings are arranged such that a centre axis of the conrod is located above a surface of the crankpin journal where no oil supply opening is located. This gives the exemplary effect that the crankpin bearing is subjected to its largest forces where it has a full bearing surface to take up the force.

In one exemplary embodiment a vehicle is provided with the variable compression ratio combustion engine with the crankshaft and conrod assembly.

The crankshaft and conrod assembly have been described in conjunction with a combustion engine and a vehicle, however the crankshaft and conrod assembly is suitable to use in any other application where the conrod needs to be fed with an oil pressure.

BRIEF DESCRIPTION OF THE DRAWINGS

The invention will be described in greater detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure. All drawings are schematic.

Figure 1:
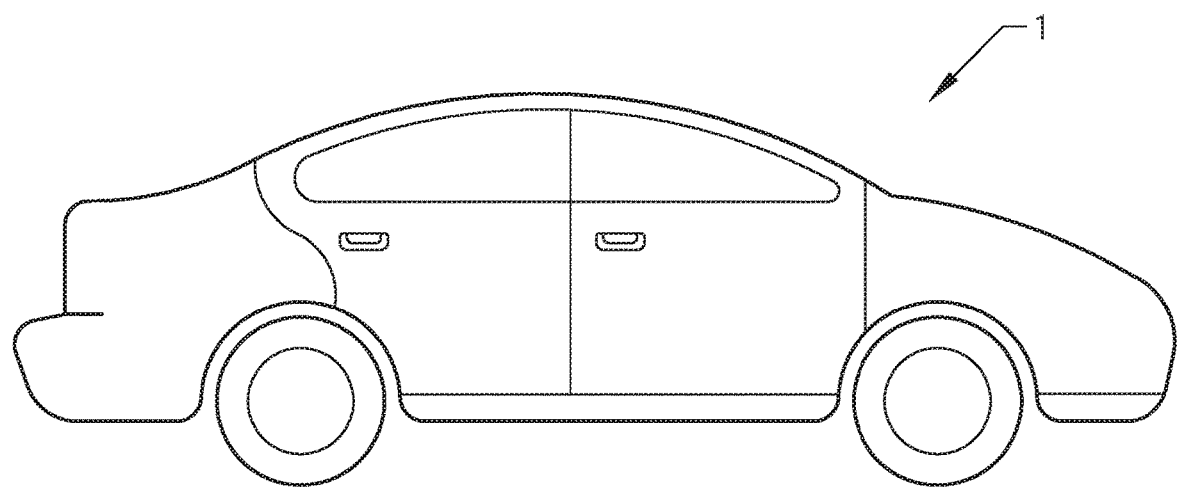
FIG. 1: Schematic view of a vehicle.
Figure 2:
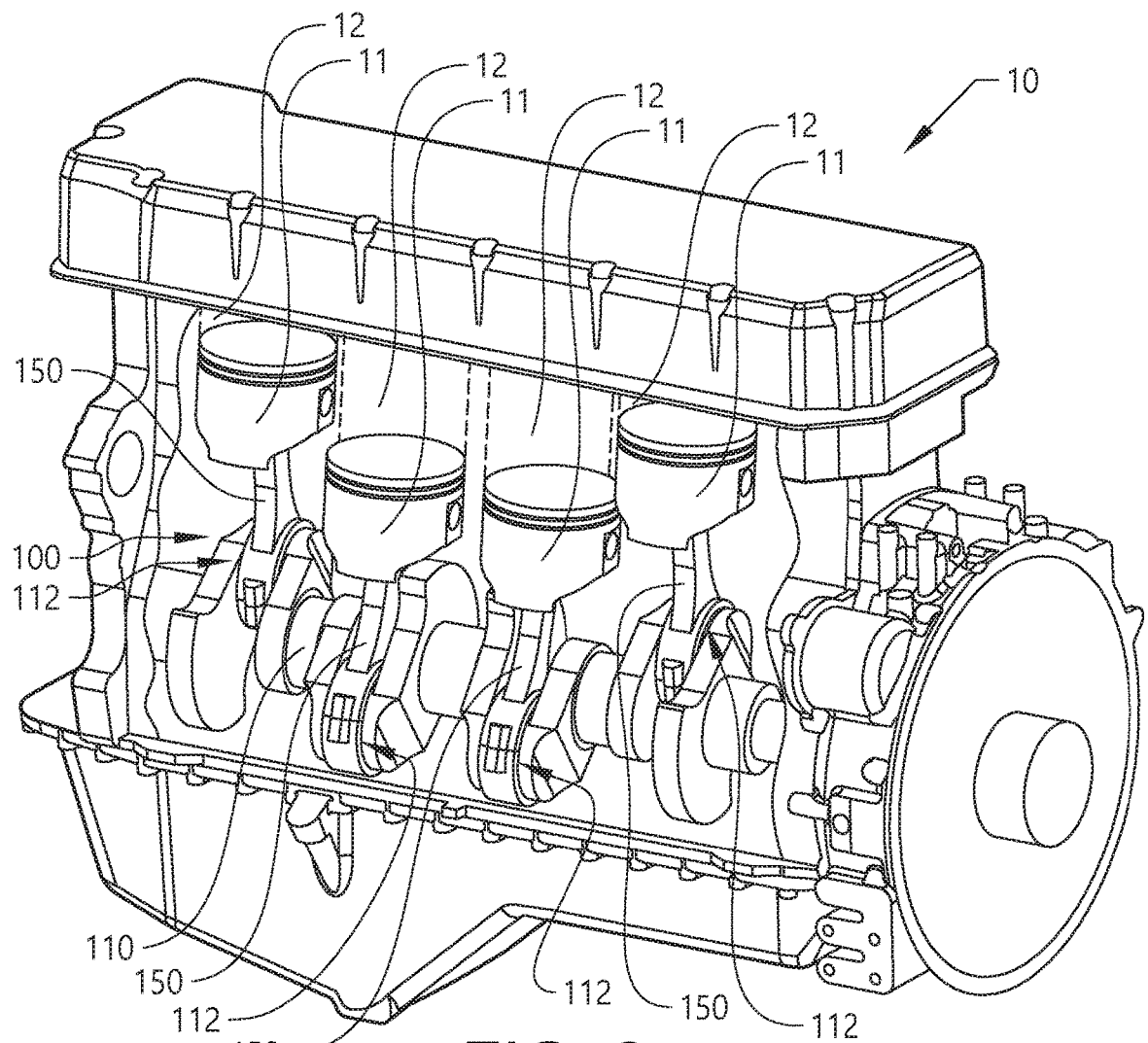
FIG. 2: Schematic view of a combustion engine provided with a crankshaft and conrod assembly.

FIGS. 1 and 2 is provided to get an overview of an exemplary environment of the crankshaft and conrod assembly 100 of the present disclosure.

FIG. 1 shows a schematic drawing of a vehicle 1 that can be provided with a combustion engine 10 and crankshaft and conrod assembly 100 as presented in this disclosure.

FIG. 2 discloses an exemplary variable compression ratio combustion engine 10 provided with a crankshaft and conrod assembly 100 as presented in this disclosure. The exemplary combustion engine 10 in FIG. 2 is a four cylinder engine, whereby the exemplary crankshaft 110 is provided with four crankpin journals 112. Upon each crankpin journal 112 is a conrod 150 mounted, which connects to the pistons 11 to reciprocate in the cylinders 12. As apparent, the principle of the disclosed crankshaft and conrod assembly is however applicable in a combustion engine 10 with any number of odd or even cylinders 12. The general idea of the presented crankshaft conrod assembly 100 can be applied upon a crankshaft 110 with at least one crankpin journal 112 or a crankshaft 110 with a plurality of crankpin journals 112.

Figure 3A:
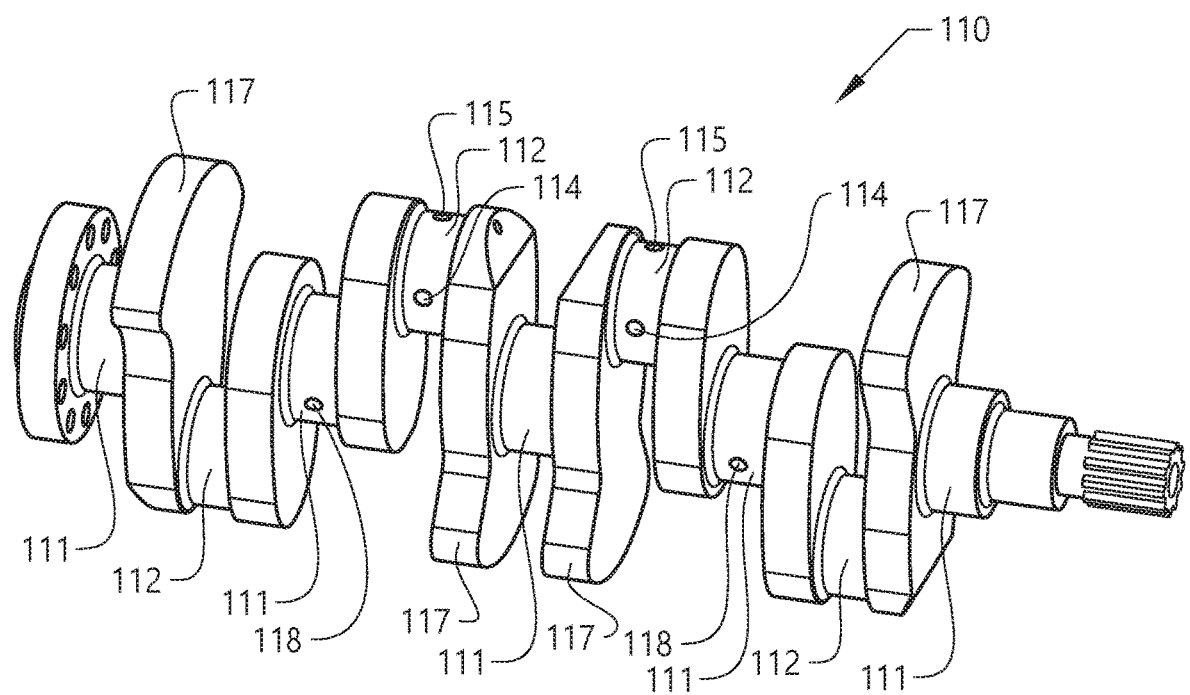
FIG. 3a, b: Schematic view of a conrod.
Figure 3B:
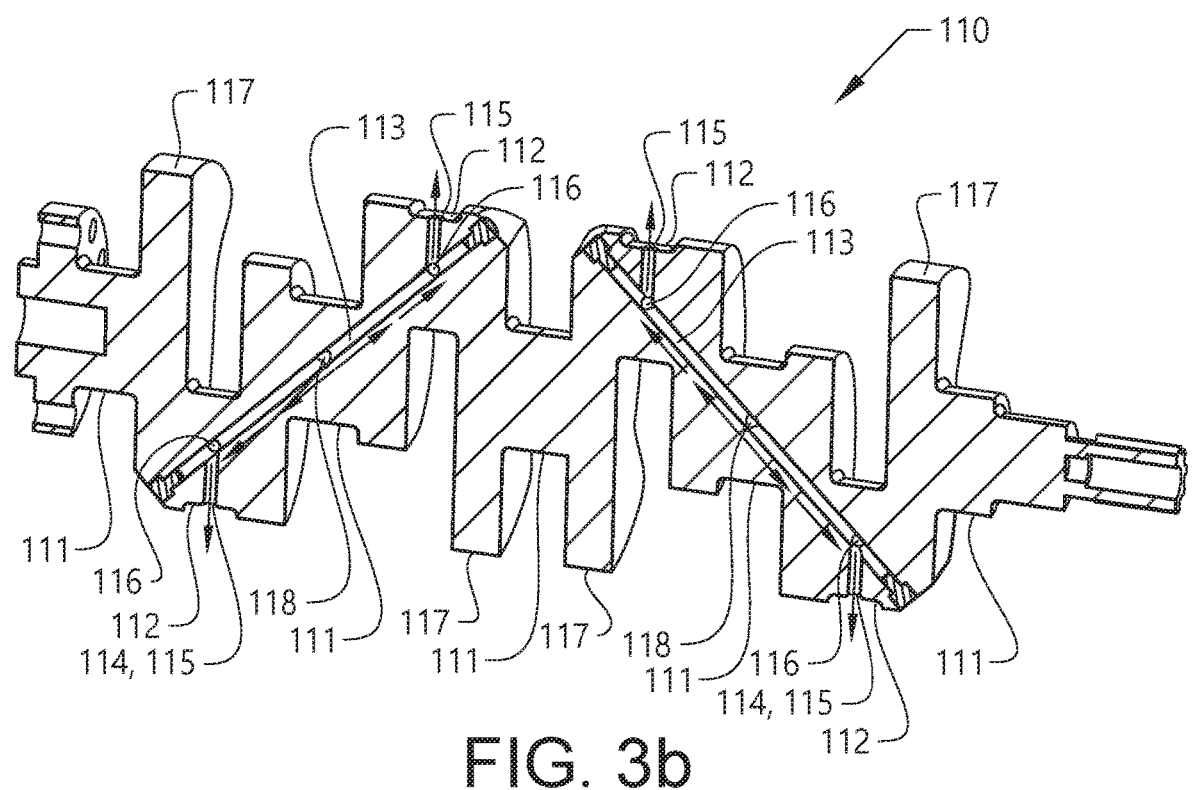

In FIGS. 3a and b an exemplary crankshaft 110 in a perspective (FIG. 3a) and a cross section (FIG. 3b) is disclosed. The crankshaft 110 is provided with five main journals 111, and four crankpin journals 112. As can be seen oil supply conduits 113 is provided within the crankshaft 100 to feed oil out to the crankpin journals 112. The oil supply conduits extend from a main journal 111 and extend out to the crankpin journals 112. A first and second oil supply opening 114, 115 are provided at the crankpin journals 112 and are connecting with the oil supply conduits 113 in a connection point 116. The main journals 111 from which centre the oil supply conduits 113 extend are provided with oil supply openings 118 in order to feed oil pressure into the oil supply conduit 113. The arrows indicate the oil feeding direction. The oil supply openings 114, 115 are normally disposed in centrally in an axial direction of the crankpin journal 112. Other dispositions could also be used, as long as the oil grooves upon a corresponding bearing sleeve 151 are arranged correspondently.

This exemplary crankshaft 110 is further provided with counterweights 117. The counterweights 117 are provided to balance the crankshaft 110.

Figure 4A:
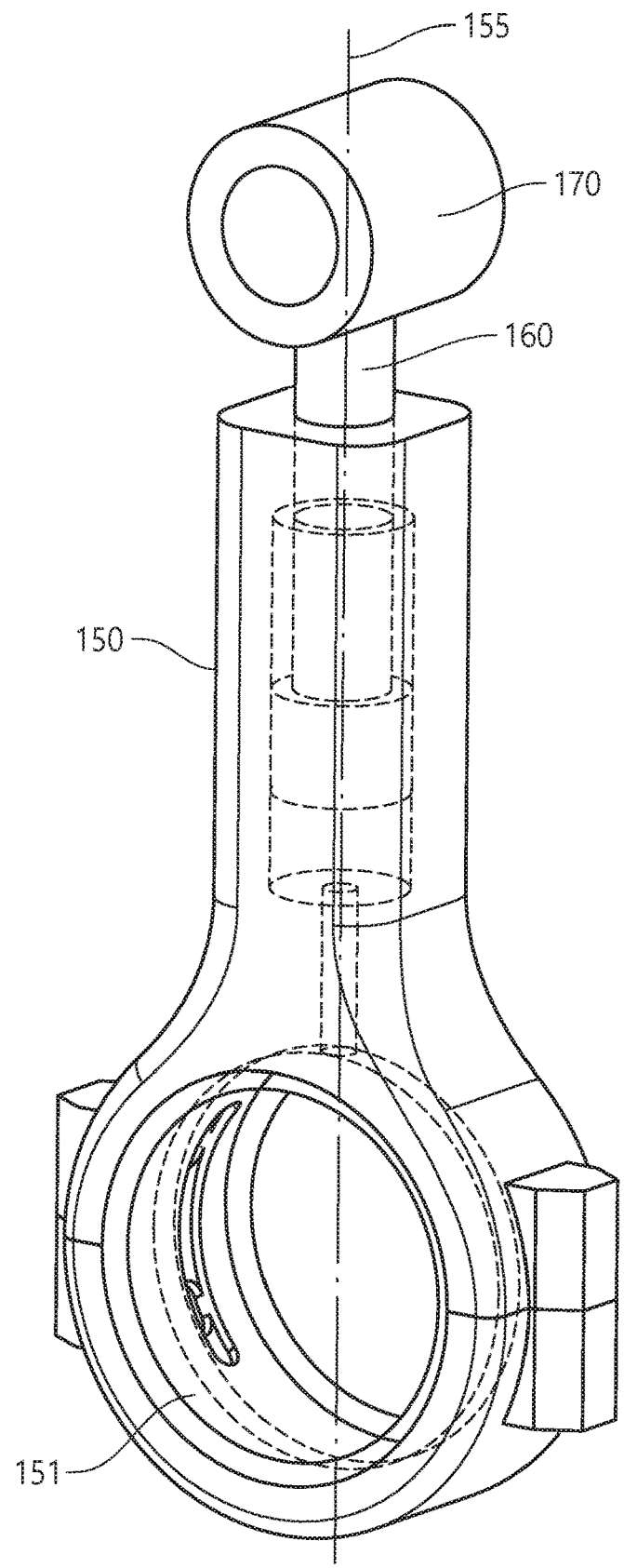
FIG. 4a-c: Schematic views of a conrod and a bearing sleeve of a conrod.

Now in FIG. 4a an exemplary conrod 150 is disclosed. The shaft 160 of the conrod 150 can be varied in length through a not disclosed cylinder mechanism. The variable length of the conrod 150 enables a variable compression ratio at a combustion engine 10. The cylinder mechanism is controlled through oil pressure, which is fed through the crankpin journal 112, via the bearing sleeve 151 of the conrod 150.

As known, the upper end of the conrod 150 is provided with a coupling 170 to the piston 11 of the combustion engines 10 cylinder 12.

Figure 4B:
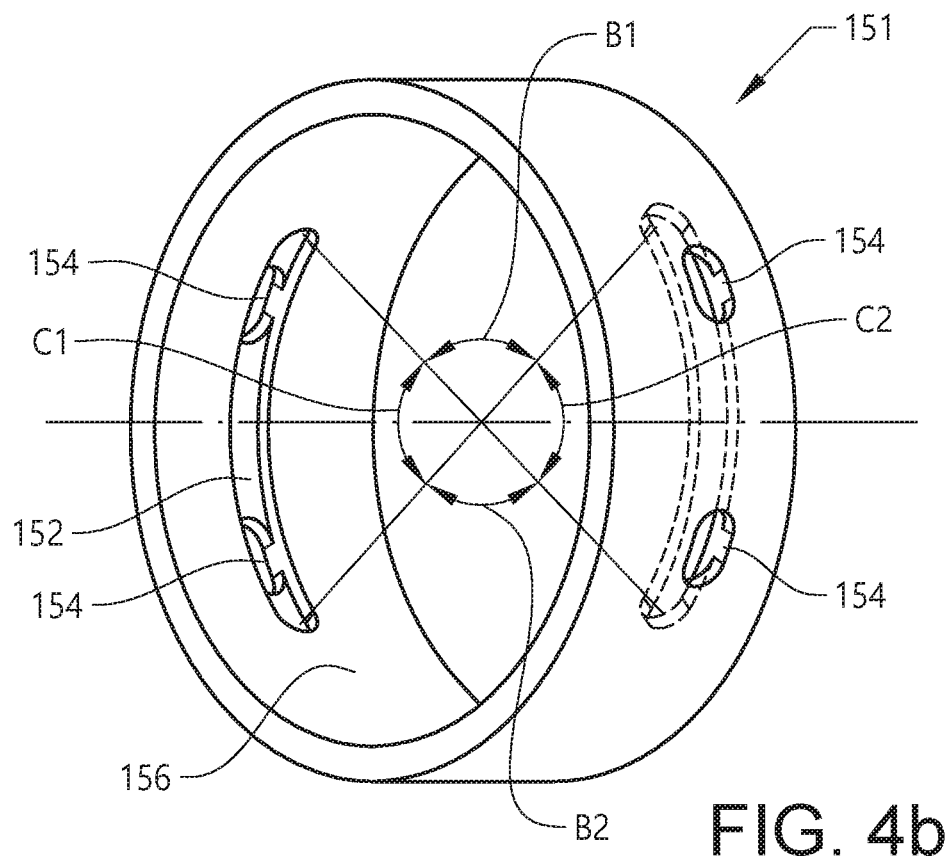
Figure 4C:
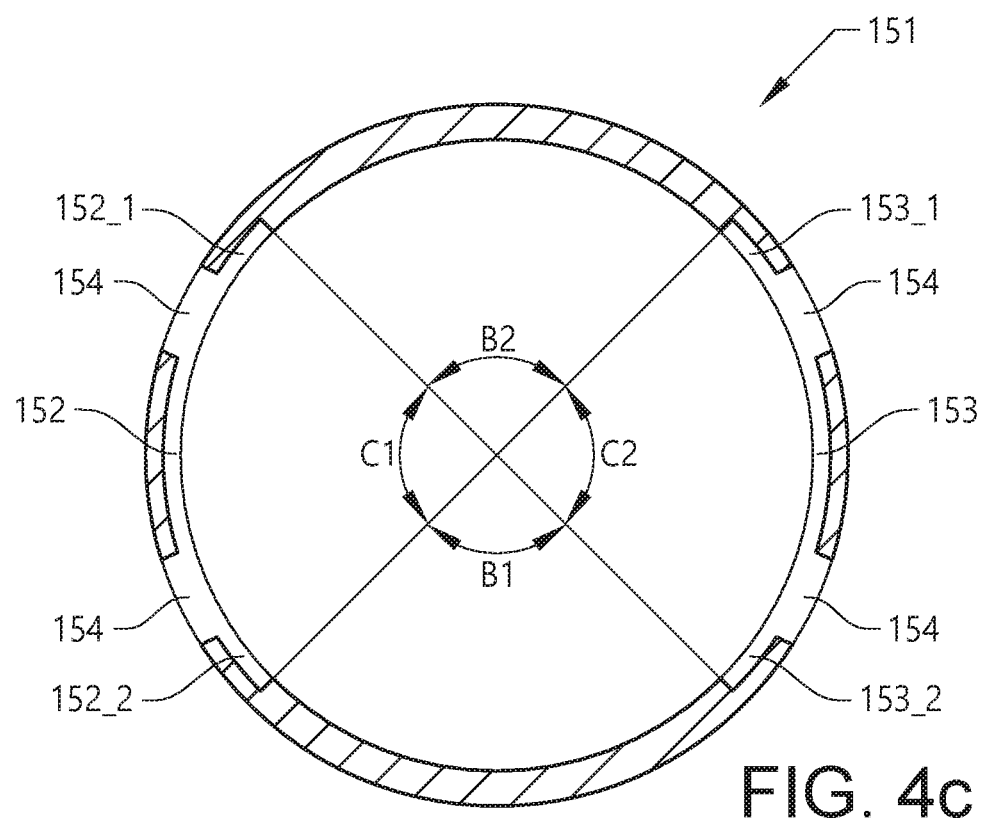

In the lower end of the conrod 150 is the connection to crankpin journal 112 provided and it includes the bearing sleeve 151. An exemplary embodiment of the bearing sleeve 151 is shown in FIG. 4b and in FIG. 4c in a cross section view. The bearing sleeve 151 is the outer part in a sliding bearing, which inner part is the crankpin journal 112, at which the inner surface 156 of the bearing sleeve 151 slides.

The inner surface 156 of the bearing sleeve 151 is provided with oil grooves 152, 153, which are provided in the circumferential direction on the inner surface 156. The axial position of the grooves 152, 153 corresponds to the axial position of the oil feed openings 114, 115 upon the crankpin journals 112. It is important to minimise the area of the oil grooves 152 in order to keep the bearing as small as possible. In the exemplary embodiment disclosed in FIG. 4a, b, c the oil grooves 152, 153 are centrally arranged in the axial direction.

The oil grooves 152, 153 are provided for feeding oil pressure to the conrod 150 and since the conrod 150 must be provided with a constant oil pressure, at least one of the oil grooves 152, 153 must be in contact with an oil supply opening 114, 115 of the crankpin journal 112 at all times.

In the exemplary embodiments of the bearing sleeve 151 disclosed, a feeding hole 154 is provided in the proximity of each end 152_1, 152_2, 153_1, 153_2 of the oil grooves 152, 153. Alternatives with alternative positioning of the feed holes 154 and/or just one feed hole 154 is possible, just as additional feed holes 154 could be provided if deemed to be necessary, without departing from the scope of the claims.

The angular length C1, C2 of the oil grooves 152, 153 is important in relation to the angle between oil feed openings 114, 115 upon the crankpin journal 112 and the angles B1, B2 between two opposing ends 152_1, 153_1; 152-2, 153_2 of the oil grooves 152, 153 in order to realise a constant oil pressure to the conrod 150. This will be described more in detail in relation to FIG. 7a-b.

In the exemplary embodiment disclosed in FIGS. 4b and c, the oil grooves 152, 153 are of equal length and are symmetrically arranged in axial, radial and circumferential direction, which gives identical angular lengths C1, C2 of the oil grooves 152, 153 and identical angels B1, B2 between the opposing ends 152_1, 153_1; 152-2, 153_2 respectively. Embodiments with oil grooves 152, 153 with different lengths and none symmetrically arrangement, giving different angular lengths C1, C2 and different angles B1, B2 is also possible without departing from the scope of the present disclosure.

Figure 5A:
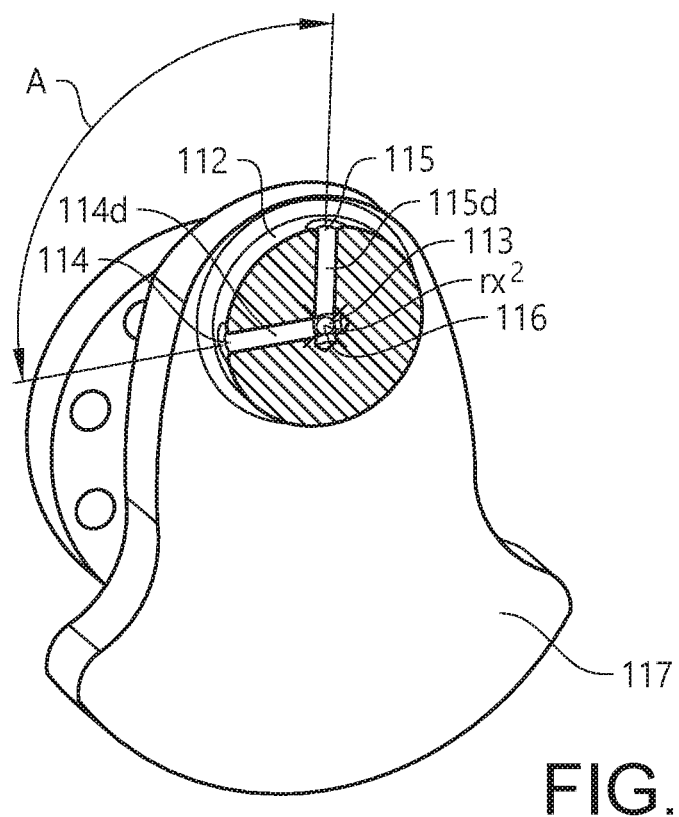
FIG. 5a, b: Schematic views of exemplary arrangements of oil supply openings at the crankpin journal.

In FIG. 5a, b a cross section view through a crankpin journal 112 of the crankshaft 110 is disclosed. The cross section is through the first crankpin 112 of the exemplary crankshaft 110 in FIG. 3, disclosing the connection point 116 of the oil supply conduit 113 and oil supply openings 114, 115. Additional crankpins 112 of a crankshaft 110 are preferably provided with a correspondent oil supply structure.

The exemplary crankpin journal 112 disclosed in FIG. 5a is provided with two oil supply openings 114, 115, which are arranged in an angle A, about 90° towards each other. The oil supply openings 114, 115 are realised through channels 114_d, 115_d arranged in an essentially 90° angle from the surface of the crankpin journal 112. The oil channels 114d, 115d of the respective oil supply opening 114, 115 meets the oil supply conduit 113 in the connection point 116, which thereby is located in the centre of the crankpins journals 112 centre axis rx2.

Other angles between the oil supply openings 114, 115 are possible. The layout of the oil supply openings 114, 115 in relation to the layout of the oil grooves 152, 153 in the bearing sleeve 151, will be discussed in further detail in relation to FIG. 6a, b. The two oil supply openings 114, 115 could be realised by providing two bore holes in the surface of the crankpin journal 112.

Figure 5B:
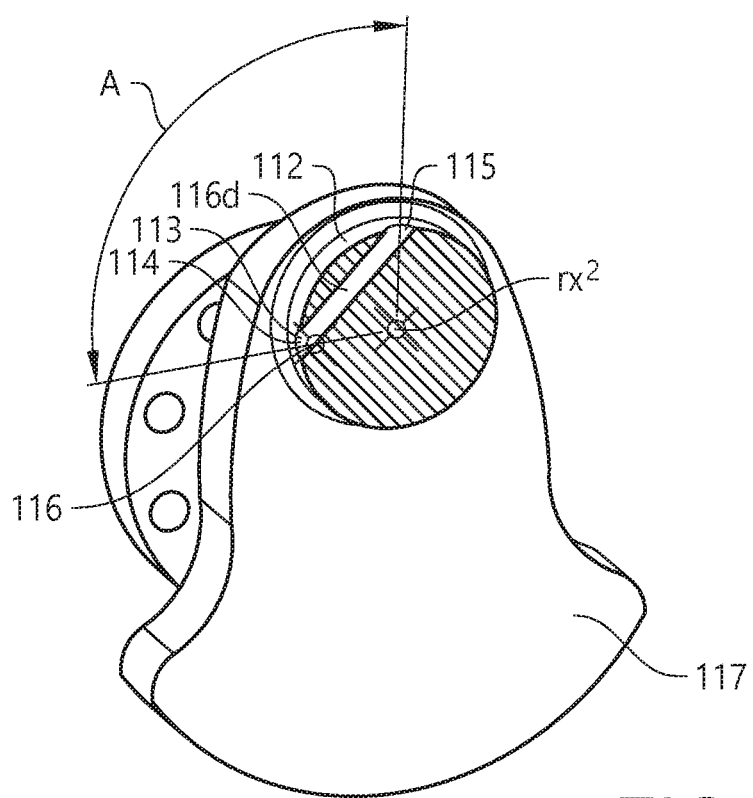

In the exemplary crankpin journal 112 disclosed in FIG. 5b the two oil supply openings 114, 115 are also arranged in an angle A about 90° towards each other. The openings are however connected through one straight oil channel 116d arranged as a chord between the two oil supply openings 114, 115. Providing the oil channel 116d as a chord instead of two perpendicular channels means that the oil channel 116d does not extend through the centre axis rx2 of the crankpin journal 112, whereby the connection point 116 with the oil supply conduit must be provided elsewhere. In this exemplary embodiment the connection point 116 is provided close to the first oil supply opening 114.

Now the relation between the first and second oil supply opening 114 and any eventual additional oil supply openings 216 and the oil grooves 152, 153 in the bearing sleeve will be described in relation to the schematic FIGS. 6a-c.

Figure 6A:
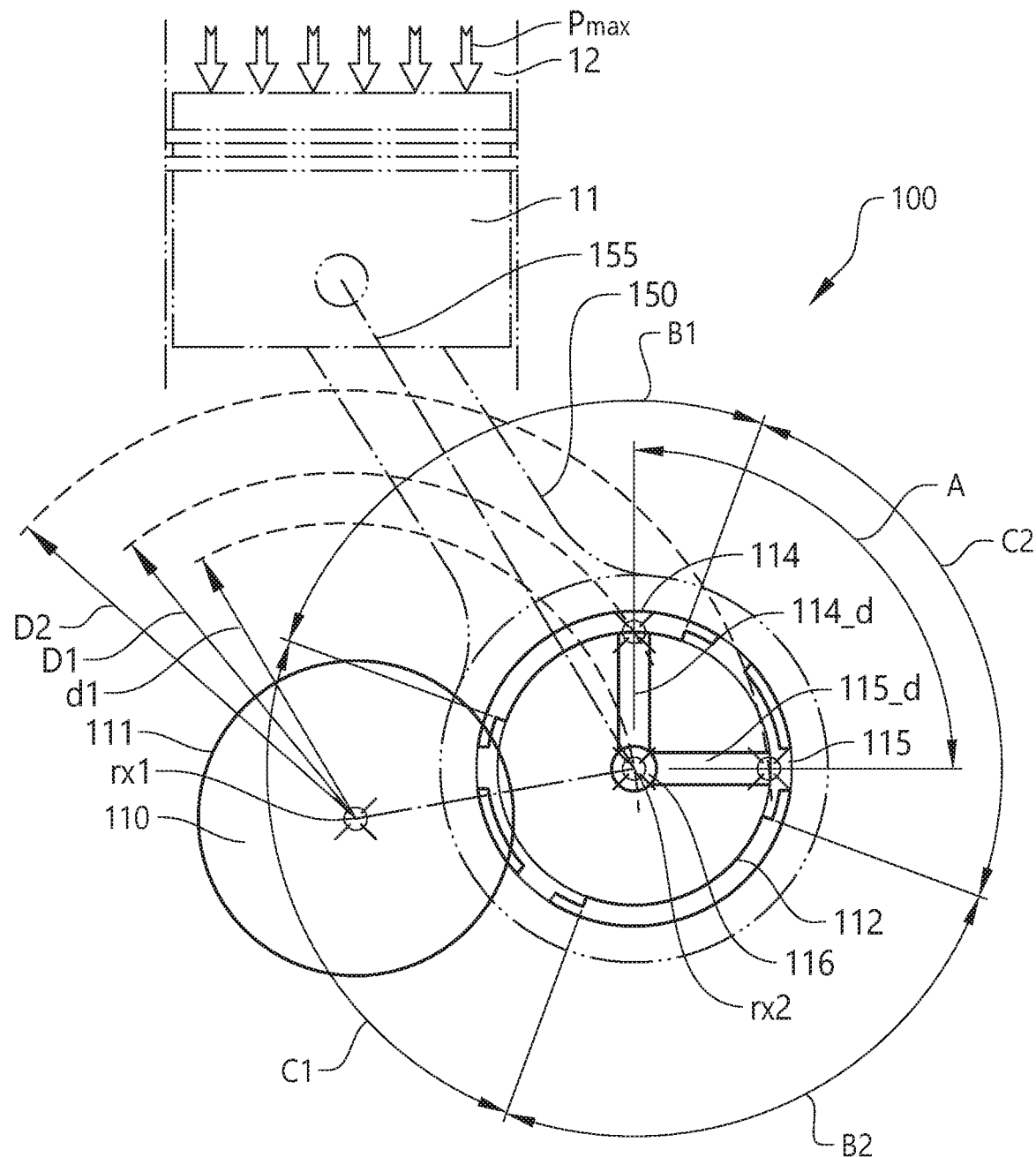
FIG. 6a-c: Schematic views of exemplary arrangements of an exemplary crankshaft conrod assembly in a combustion engine.

In FIG. 6a a schematic view of a crankshaft conrod assembly 100 provided in an environment of a combustion engine 10. The combustion engine 10 is symbolised by the cylinder 12, with the piston 11 in the position where the combustion in the cylinder 12 exercises the highest load Pmax on the piston 11 and therefore also the conrod 150. The figure is schematically disclosed and does not reflect the actual measurements of e.g. angles.

Common for all the embodiments of the crankshaft conrod assembly is that the first oil supply opening 114 is provided at a first radial distance D1 from a rotational axis rx1 of the crankshaft 110 and that the second oil supply opening 115 is provided at a second radial distance D2 from the rotational axis rx1 and both the first and second radial distance D1, D2 are larger or equal to the distance d1 between the connection point 116 and the rotational axis rx1 of the crankshaft 110. Additional oil supply openings 216, (e.g. FIG. 6c) can be provided at distances D3 that also are larger or equal to the distance d1 between the connection point 116 and the rotational axis rx1 of the crankshaft 110. As long as this requirement is fulfilled any suitable number of supply openings above two, can be provided.

The distance d1 between the connection point 116 and the rotational axis rx1 of the crankshaft 110 is preferably minimized. Ideally, the connection point 116 could be positioned at the edge of the crankpin journal 112, on or close to the line connecting the rotational axis rx1 of the crankshaft and the centre axis rx2 of the crankpin journal. This would constitute the shortest distance between the connection point 116 and the rotational axis rx1 of the crankshaft 110. This position is however not best suited for the connection point 116 due to geometric properties of the crankshaft which makes it difficult to drill an oil supply conduit to this position. In order to minimize the rotational speed dependency of the oil pressure in the oil feed to the connection point, the distance d1 should be minimized. In this way, the centrifugal forces acting on the oil column in the oil feed system are minimized, which in turn will reduce the need to supply a high oil pressure to the oil feed system through oil supply openings 118. The opening angle A between the first and second oil supply opening is dependent on the position of the connection point and the length of the first and second oil groove of the bearing sleeve.

Hence, D1, D2 and D3≥d1 and when this criteria is fulfilled the crankshaft conrod assembly 100 will benefit the exemplary effect that the oil pressure fed to the conrod 150 will be helped by or at least not contracted by the centrifugal force caused by the rotation of the crankshaft 110. By way of example up to three oil supply openings 114, 115, 216 are described, however additional oil supply openings could be provided within the requirements set, without departing from the scope of this disclosure.

Further to the exemplary embodiment disclosed in FIG. 6a, where the crankshaft and conrod assembly 100 is provided with an opening angle A between the first and the second oil supply opening 114, 115. The angle A is larger or equal to the angels B1, B2 between the opposing end portions 152_1, 153_1; 152_2, 153_2 of the two oil grooves 152, 153, and smaller or equal to the angular length C1, C2 of the respective oil groove 152, 153. I.e.:

$$A \geq (B1 \text{ and } B2); A \leq (C1 \text{ and } C2);$$

$$(C1 \text{ and } C2) \geq (B1 \text{ and } B2).$$

An exemplary effect, of the relation between the opening angle A between the first and second oil supply opening, the angle B1, B2 between the opposing end portions 152_1, 153_1; 152_2, 153_2 of the oil grooves 152, 153 and the angular length C1, C2 of the oil grooves 152, 153, is that at least one oil groove 152, 153 will always be in fluid contact with one oil supply opening 114, 115, whereby oil pressure always will be provided to the conrod 150, independent of angular position of the conrod 150 upon the crankpin journal 112 and at the same time enabling that the oil grooves 152, 153 can be held as short as possible and thereby maximising the bearing surface unaffected by oil supply openings/groves that reduce the load carrying capacity of the bearing and thereby minimising the needed width of the bearing.

In the exemplary embodiment of FIG. 6a, the oil grooves 152, 153 are arranged such that the angles B1, B2 between the opposing end portions 152_1, 153_1; 152_2, 153_2 of the two oil grooves 152,153 are essentially equal, i.e. B1=B2. Further, the angular length C1, C2 of the first oil groove 152 is essentially equal to the angular length C2 of the second oil groove 153, i.e. C1=C2. Still further the oil supply openings 114, 115, the oil grooves 152, 153 are arranged axial centrally in the bearing.

In the exemplary embodiment disclosed the connection point 116 can be arranged anywhere as long as the equation d1≤D1, D2, D3 is fulfilled.

Figure 6B:
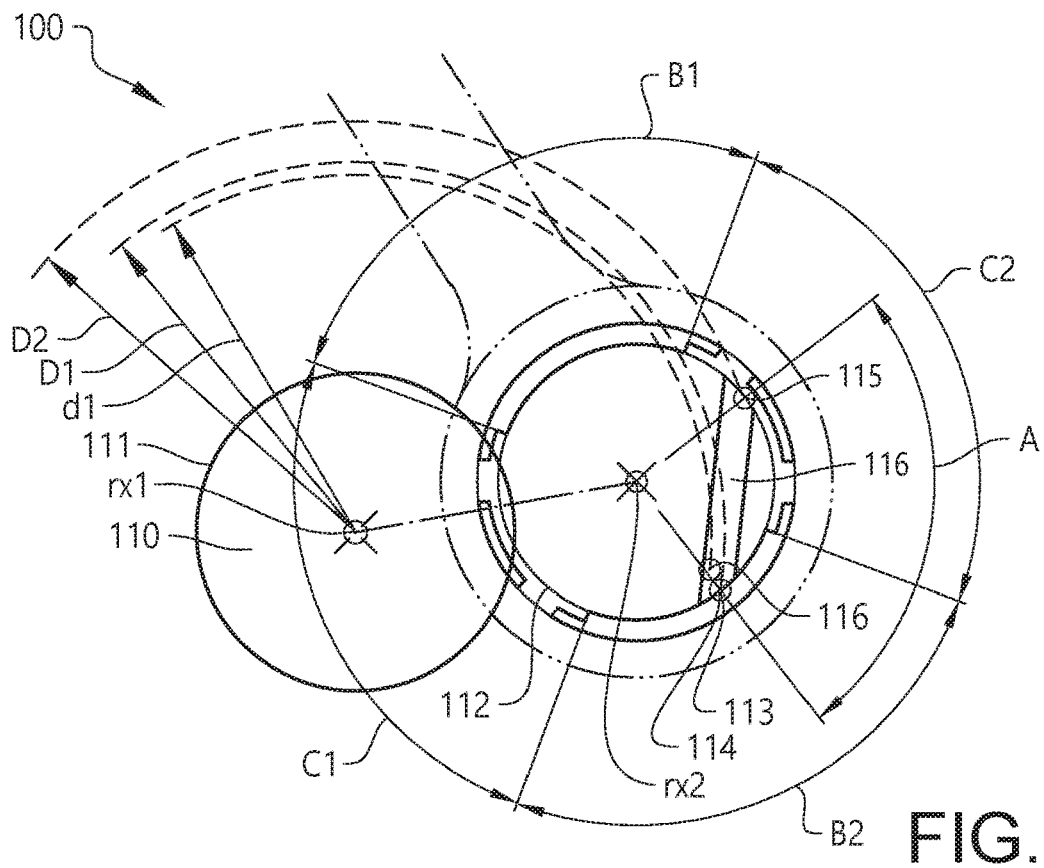

In the exemplary embodiment of the crankshaft and conrod assembly 100 disclosed in FIG. 6b the same relation between the position of oil supply openings 114, 115 and the oil grooves 152, 153 of the bearing sleeve 151 exists. The difference is that the oil supply openings 114, 115 are connected through an oil channel 116d provided as a chord through the crankpin journal 112. This also means that the connection point 116 is provided along the chord at the position located closest to the rotational axis rx1 of the crankshaft 110.

The distance d1 between the connection point 116 and the rotational axis rx1 of the crankshaft 110 is preferably minimized also when the oil channel 116d is provided as a chord through the crankpin journal 112. The distance d1 between the connection point 116 and the rotational axis rx1 of the crankshaft 110 is in one example shorter than the distance between the rotational axis rx1 of the crankshaft 110 and the centre axis rx2 of the crankpin journal 112. It is also of advantage to minimize the distance D1 between the first oil supply opening 114 and the rotational axis rx1 of the crankshaft 110 and to minimize the distance D2 between the second oil supply opening 115 and the rotational axis rx1 of the crankshaft 110 at the same time.

However, the distance d1 between the connection point 116 and the rotational axis rx1 of the crankshaft 110 should be shorter than or equal to the distance D1 between the first oil supply opening 114 and the rotational axis rx1 of the crankshaft 110 and shorter than or equal to the distance D2 between the second oil supply opening 115 and the rotational axis rx1 of the crankshaft 110.

Preferably, the distance d1 between the connection point 116 and the rotational axis rx1 of the crankshaft 110 is less than 90% of the distance between the rotational axis rx1 of the crankshaft 110 and the centre axis rx2 of the crankpin journal 112, and more preferably less than 80% of the distance between the rotational axis rx1 of the crankshaft 110 and the centre axis rx2 of the crankpin journal 112.

If in the exemplary embodiments disclosed in FIG. 6a, b, exemplary angles would be angle A between the first and second oil supply opening 114, 115 is 95°, angle B1, B2 is 90° and angle C1, C2 be above 90°. These numbers are given as means of example and should not be seen as limiting. However, in about this range the exemplary advantage of large surface area of the bearing and as few number of supply openings as possible can be reached.

The two extreme cases of the opening angle are 0 respective 180 degrees. In the case of 0 degrees the two oil supply openings are placed on the same position, and reality is only one oil supply opening, whereby the oil grooves in the bearing sleeve must extend 360 degrees about circumference in order to establish a constant oil pressure delivery to the conrod independent of the position of the conrod upon the crankpin journal. In the case of 180 degrees between the oil supply openings, one oil groove extending 180 degrees about the circumference of the bearing sleeve would be sufficient. Any angle between 0 and 180 degrees between the first and second oil supply opening 114, 115 is possible.

Figure 6C:
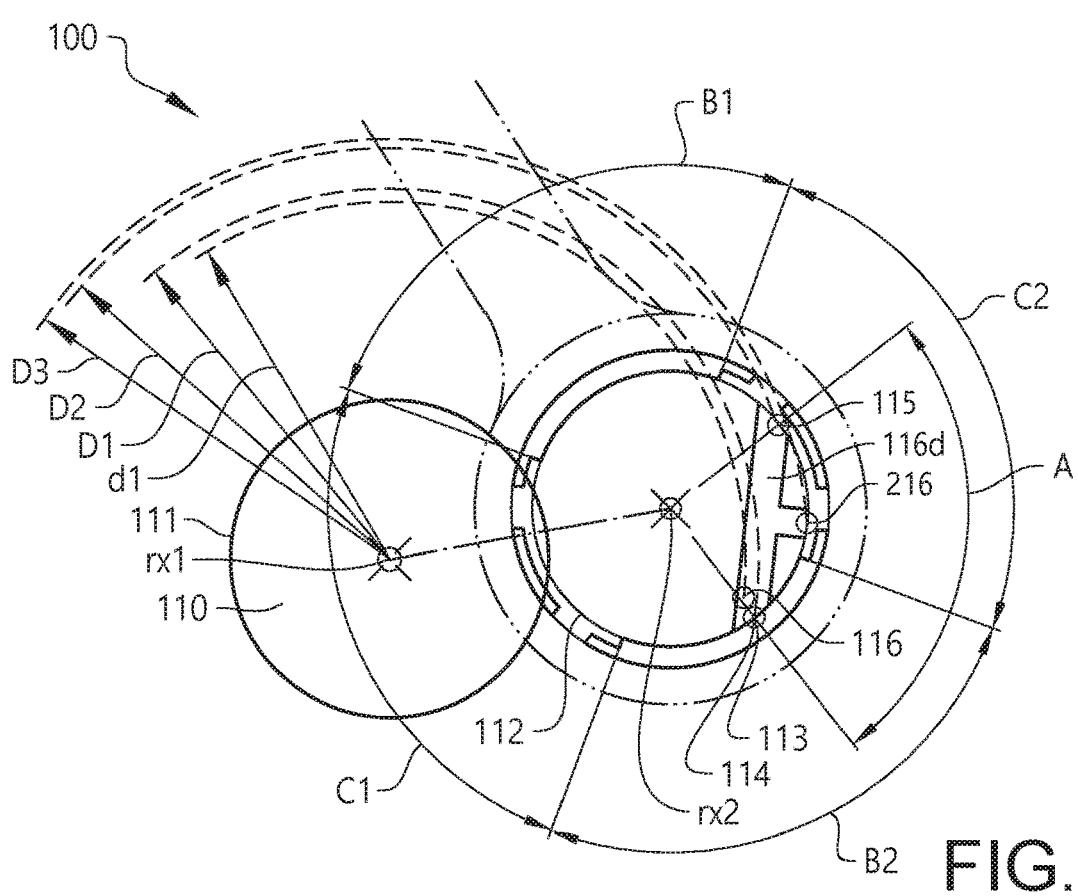

An alternative exemplary embodiment of oil supply opening layout is disclosed in FIG. 6c, where three oil supply openings 114, 115, 216 are provided. A third oil supply opening 216 have been provided in-between the first and the second oil supply opening 114, 115. An exemplary effect of providing three (or more) oil supply openings on the crankpin journal 112 is that by having a larger angle A between the first and second oil supply opening 114, 115 the angular length C1, C2 of the oil grooves 152, 153 can be made smaller and still enabling that at least one oil supply opening 114, 115, 216 are connected to one of the oil grooves 152, 153. Smaller oil grooves 152, 153 give a larger bearing surface, which improves the load baring capability of the bearing. Still any angle between 0 and 180 degrees between the first and second oil supply opening 114, 115 is possible. Additional oil supply openings 216 can minimise the length of the grooves in the bearing sleeve 151.

The first, the second and the third supply opening 114, 115, 216 can be provided by individual channel all connecting to the connection point 116. Alternatively can as disclosed in FIG. 6c the first and second oil supply opening be connected through a chord channel 116d and the third supply opening connect to the chord channel 116d.

Within this context also more than two oil grooves in the bearing sleeve 151 in combination with additional oil supply openings on the crankpin journal can be provided in order to achieve an optimal bearing surface spread for the intended application of the crankshaft conrod assembly 100.

From one perspective as few oil supply openings 114, 115 as possible is desired in order to minimise the number of process in the manufacturing of the crankshaft 110. However, just one oil supply openings would mean that the bearing sleeve 151 must be provided with an oil groove that extends along the whole circumference in order to ensure continuous oil pressure feed to the conrod 150. This would decrease the load bearing abilities of the bearing, since the total bearing surface would decrease and the hydrodynamic oil pressure in the bearing being reduced by the groove.

However already with a crankshaft conrod assembly 100 with only two oil supply openings 114, 115 in the crankpin journal 112 significantly shorter oil grooves 152, 153 can be achieved. Hence, the crankshaft and conrod assembly suggested in the present disclosure comprises at least two oil supply openings 114, 115.

In an application of the crankshaft and conrod assembly 100, the assembly 100 is arranged in the combustion engine 10 such that when the combustion in the cylinder 12 of the combustion engine 10 exercises its highest force Pmax upon the conrod 150, the bearing sleeve 151 and the oil supply openings 114, 115, 216 are arranged such that a centre axis 155 of the conrod 150 is located above a surface of the crankpin journal 112 where no oil supply opening 114, 115, 216 is located. This gives the exemplary effect that the crankpin bearing is subjected to its largest forces Pmax where it has a full bearing surface to take up the force. This relation is desirable in all application of the crankshaft conrod assembly. In application where there are several positions where there are high loads upon the conrod the disposition of the oil supply openings should be adapted accordingly.

The invention claimed is:

1. A crankshaft and conrod assembly comprising a crankshaft and a conrod, wherein:
the crankshaft comprises at least one main journal and one crankpin journal, and the at least one conrod is provided upon the crankpin journal, and the crankshaft is provided with an oil supply structure for supplying the crankpin journal with lubrication oil and the conrod with an oil pressure, wherein the oil supply structure comprises:
an oil supply conduit provided between the main journal and the crankpin journal, at least a first and a second oil supply opening provided at the crankpin journal, and
a connection point where the oil supply conduit connects to the first and second oil supply openings,
wherein the conrod is arranged upon the crank pin journal through a bearing sleeve, at which at least a first and a second oil groove is provided in a circumferential direction at an inner surface of the bearing sleeve,
wherein the first oil supply opening is provided at a first radial distance (D1) from a rotational axis (rx1) of the crankshaft and where the second oil supply opening is provided at a second radial distance (D2) from the rotational axis (rx1) and where both the first and the second radial distances (D1, D2) are larger than or equal to the distance (d1) between the connection point and the rotational axis (rx1) of the crankshaft, and wherein an opening angle (A) between the first and the second oil supply opening is larger or equal to an angle (B1, B2) between opposing end portions of the two oil grooves and smaller or equal to the angular length (C1, C2) of the respective oil groove.

2. The crankshaft and conrod assembly according to claim 1, wherein the distance (d1) between the connection point and the rotational axis (rx1) of the crankshaft is shorter than the distance between the rotational axis (rx1) of the crankshaft and the centre axis (rx2) of the crankpin journal.

3. The crankshaft and conrod assembly according to claim 2, wherein the distance (D1) between the first oil supply opening and the rotational axis (rx1) of the crankshaft is shorter than the distance between the rotational axis (rx1) of the crankshaft and the centre axis (rx2) of the crankpin journal.

4. The crankshaft and conrod assembly according to claim 2, wherein the distance (D2) between the second oil supply opening and the rotational axis (rx1) of the crankshaft is shorter than the distance between the rotational axis (rx1) of the crankshaft and the centre axis (rx2) of the crankpin journal.

5. The crankshaft and conrod assembly according to claim 2, wherein the distance (d1) between the connection point and the rotational axis (rx1) of the crankshaft is less than 90% of the distance between the rotational axis (rx1) of the crankshaft and the centre axis (rx2) of the crankpin journal.

6. The crankshaft and conrod assembly according to claim 5, wherein the distance (d1) between the connection point and the rotational axis (rx1) of the crankshaft is less than 80% of the distance between the rotational axis (rx1) of the crankshaft and the centre axis (rx2) of the crankpin journal.

7. The crankshaft and conrod assembly according to claim 1, wherein the angular length (C1) of the first oil groove is essentially equal to the angular length (C2) of the second oil groove.

8. The crankshaft and conrod assembly according to claim 1, wherein an angle (A) between the first and the second oil supply opening is larger than an angle (B1, B2) between opposing end portions of the two oil grooves and the angle (A) between the first and the second oil supply opening is larger than the angular distance (C) of at least one of the oil grooves and at least a third oil supply opening is provided in between the first and the second oil supply opening.

9. The crankshaft and conrod assembly according to claim 1, wherein the first and second oil supply opening are connected with a channel extending as a chord between the first and second oil supply opening and that the connection point is provided at the proximity of the one of the first and second oil supply openings that is arranged the shortest distance (D1, D2) from the rotational axis (rx1) of the crankshaft.

10. The crankshaft and conrod assembly according to claim 1, wherein the connection point is provided at a centre axis (rx2) of the crankpin journal and the oil supply openings constitutes drill holes, which extends essentially perpendicular from an outer surface of the crankpin journal to the connection point.

11. The crankshaft and conrod assembly according to claim 1, wherein the opening angle (A) is between 0 and 180 degrees.

12. The crankshaft and conrod assembly according to claim 1, wherein the first and the second oil groove are provided with at least one feeding hole respectively, through which the conrod can be fed with oil pressure.

13. The crankshaft and conrod assembly according to claim 1, wherein the crankshaft is provided with a plurality of crankpin journals and at least one crankpin journal is provided with a conrod.

14. A combustion engine with variable compression ratio provided with a crankshaft and conrod assembly according to claim 1.

15. The combustion engine according to claim 14, wherein when the combustion in the cylinder of the combustion engine exercises its highest force (Pmax) upon the conrod, the bearing sleeve and the oil supply openings are arranged such that a centre axis of the conrod is located above a surface of the crankpin journal where no oil supply opening is located.

16. A vehicle provided with a combustion engine with variable compression ratio according to claim 14.

17. A crankshaft and conrod assembly comprising a crankshaft and a conrod, wherein:

the crankshaft comprises at least one main journal and one crankpin journal, and the at least one conrod is provided upon the crankpin journal, and the crankshaft is provided with an oil supply structure for supplying the crankpin journal with lubrication oil and the conrod with an oil pressure, wherein the oil supply structure comprises:

an oil supply conduit provided between the main journal and the crankpin journal, at least a first and a second oil supply opening provided at the crankpin journal, and a connection point where the oil supply conduit connects to the first and second oil supply openings, wherein the conrod is arranged upon the crank pin journal through a bearing sleeve, at which at least a first and a second oil groove is provided in a circumferential direction at an inner surface of the bearing sleeve, wherein the first oil supply opening is provided at a first radial distance (D1) from a rotational axis (rx1) of the crankshaft and where the second oil supply opening is provided at a second radial distance (D2) from the rotational axis (rx1) and where both the first and the second radial distances (D1, D2) are larger than or equal to the distance (d1) between the connection point and the rotational axis (rx1) of the crankshaft, wherein the distance (d1) between the connection point and the rotational axis (rx1) of the crankshaft is shorter than the distance between the rotational axis (rx1) of the crankshaft and the centre axis (rx2) of the crankpin journal, and wherein the distance (D1) between the first oil supply opening and the rotational axis (rx1) of the crankshaft is shorter than the distance between the rotational axis (rx1) of the crankshaft and the centre axis (rx2) of the crankpin journal.

18. The crankshaft and conrod assembly according to claim 17, wherein the crankshaft comprises a counterweight.

19. A crankshaft and conrod assembly comprising a crankshaft and a conrod, wherein:

the crankshaft comprises at least one main journal and one crankpin journal, and the at least one conrod is provided upon the crankpin journal, and the crankshaft is provided with an oil supply structure for supplying the crankpin journal with lubrication oil and the conrod with an oil pressure, wherein the oil supply structure comprises:

an oil supply conduit provided between the main journal and the crankpin journal, at least a first and a second oil supply opening provided at the crankpin journal, and a connection point where the oil supply conduit connects to the first and second oil supply openings, wherein the conrod is arranged upon the crank pin journal through a bearing sleeve, at which at least a first and a second oil groove is provided in a circumferential direction at an inner surface of the bearing sleeve, wherein the first oil supply opening is provided at a first radial distance (D1) from a rotational axis (rx1) of the crankshaft and where the second oil supply opening is provided at a second radial distance (D2) from the rotational axis (rx1) and where both the first and the second radial distances (D1, D2) are larger than or equal to the distance (d1) between the connection point and the rotational axis (rx1) of the crankshaft, wherein the distance (d1) between the connection point and the rotational axis (rx1) of the crankshaft is shorter than the distance between the rotational axis (rx1) of the crankshaft and the centre axis (rx2) of the crankpin journal, and wherein the distance (D2) between the second oil supply opening and the rotational axis (rx1) of the crankshaft is shorter than the distance between the rotational axis (rx1) of the crankshaft and the centre axis (rx2) of the crankpin journal.

20. The crankshaft and conrod assembly according to claim 19, wherein the crankshaft comprises a counterweight.

* * * * *